United States Patent
Hitchingham et al.

(10) Patent No.: US 8,795,399 B2
(45) Date of Patent: Aug. 5, 2014

(54) PRETREATMENT OF BIOMASS FEED FOR GASIFICATION

(75) Inventors: Jacqueline R. Hitchingham, Anoka, MN (US); Lloyd R. White, Minneapolis, MN (US)

(73) Assignee: Syngas Technology, LLC, Elk River, MN (US)

( * ) Notice: Subject to any disclaimer, the term of this patent is extended or adjusted under 35 U.S.C. 154(b) by 0 days.

(21) Appl. No.: 13/491,496

(22) Filed: Jun. 7, 2012

(65) Prior Publication Data

US 2012/0266531 A1    Oct. 25, 2012

Related U.S. Application Data

(63) Continuation-in-part of application No. 12/825,887, filed on Jun. 29, 2010, now Pat. No. 8,282,694.

(60) Provisional application No. 61/295,358, filed on Jan. 15, 2010.

(51) Int. Cl.
   C01B 3/36      (2006.01)
   C10L 9/08      (2006.01)
   C10L 5/44      (2006.01)
   C10L 5/36      (2006.01)

(52) U.S. Cl.
   CPC ............ $C10L\ 9/083$ (2013.01); $Y02E\ 50/15$ (2013.01); $C10L\ 5/442$ (2013.01); $Y02E\ 50/30$ (2013.01); $C10L\ 5/366$ (2013.01); $C10L\ 5/445$ (2013.01); $Y02E\ 50/10$ (2013.01)
   USPC ........................................................ 48/197 R

(58) Field of Classification Search
   None
   See application file for complete search history.

(56) References Cited

U.S. PATENT DOCUMENTS

| | | | | |
|---|---|---|---|---|
| 3,855,071 A * | 12/1974 | Koppelman | ................. | 202/121 |
| 4,787,917 A * | 11/1988 | Leclerc de Bussy | ............ | 44/606 |
| 7,008,459 B1 * | 3/2006 | Fraas et al. | .................... | 48/86 R |
| 2001/0018931 A1 * | 9/2001 | Ijiri et al. | ...................... | 137/558 |
| 2007/0181465 A1 * | 8/2007 | Collette | ........................ | 208/400 |
| 2008/0223269 A1 * | 9/2008 | Paoluccio | ...................... | 110/342 |
| 2010/0120128 A1 * | 5/2010 | Liang | ............................. | 435/266 |
| 2010/0251616 A1 * | 10/2010 | Paoluccio et al. | ........... | 48/197 R |
| 2011/0219679 A1 * | 9/2011 | Budarin et al. | ................. | 44/605 |

* cited by examiner

*Primary Examiner* — Imran Akram
(74) *Attorney, Agent, or Firm* — Henry E. Naylor

(57) ABSTRACT

A process for pretreating a biomass feedstock for gasification for the production of syngas. The biomass feed, which is preferably a lignocellulosic material, is subjected to torrefaction that increases its energy density, friability, and results in higher efficiency gasification of the torrefied biomass.

16 Claims, 1 Drawing Sheet

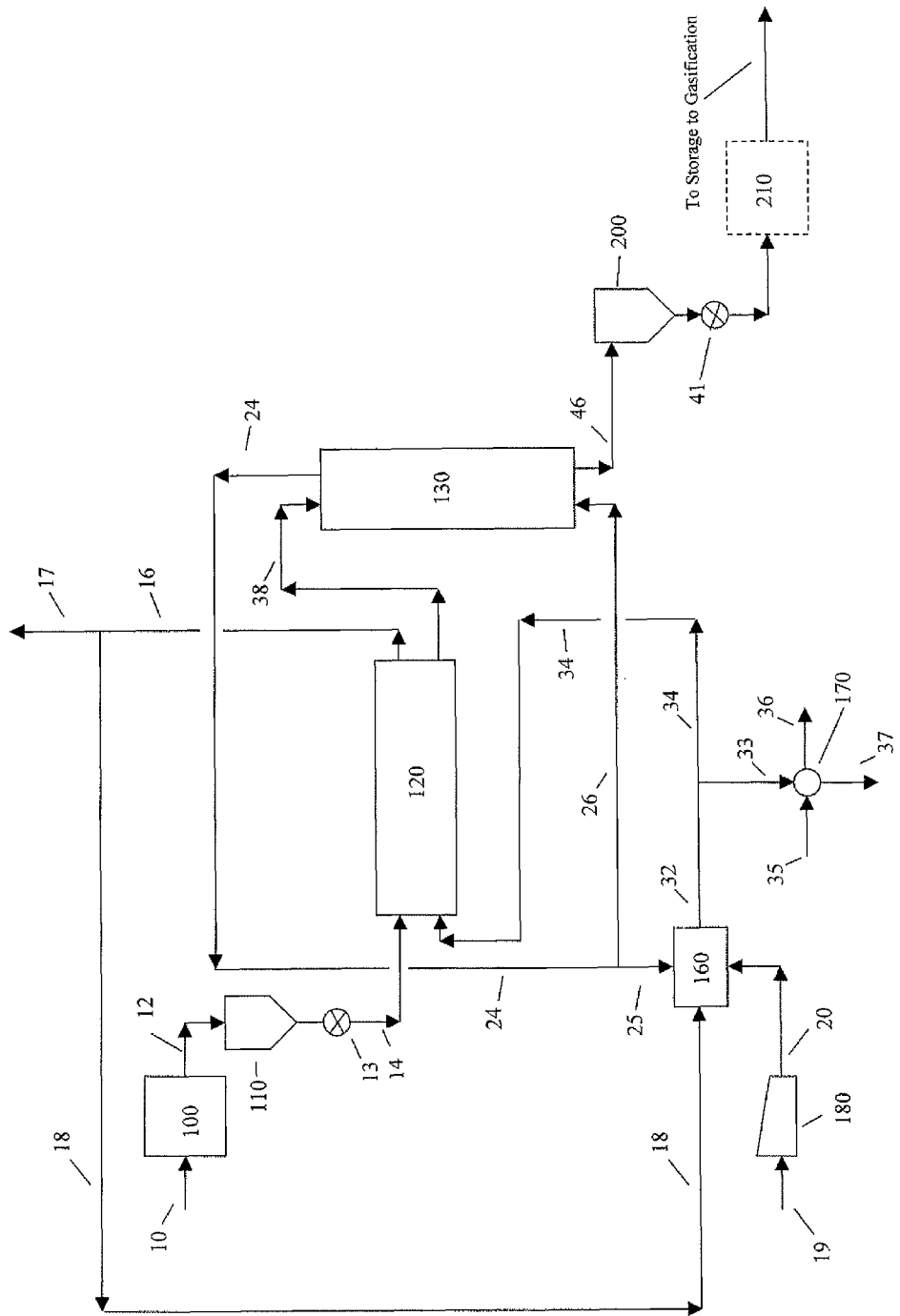

US 8,795,399 B2

PRETREATMENT OF BIOMASS FEED FOR GASIFICATION

CROSS-REFERENCE TO RELATED APPLICATIONS

This application is a Continuation-in-Part of Non-Provisional Application U.S. Ser. No. 12/825,887 filed Jun. 29, 2010 which is based on Provisional Application U.S. Ser. No. 61/295,358 filed Jan. 15, 2010.

FIELD OF THE INVENTION

The present invention relates to a process for pretreating a biomass feedstock for gasification for the production of syngas. The biomass feed, which is preferably a lignocellulosic material, is subjected to torrefaction that increases its energy density, friability, and results in higher efficiency gasification of the torrefied biomass.

BACKGROUND OF THE INVENTION

A substantial amount of research and development is being done to reduce our dependency on petroleum-based energy and to move us toward more sustainable energy sources, such as wind energy, solar energy, and biomass. Of these three sustainable energy sources, biomass has received significant attention. One reason for this is because biomass is widely available in many forms. Also, the economy of agricultural regions growing crops can greatly benefit from biomass to transportation fuel plants. Thus, governmental bodies in agricultural regions are very supportive of proposed biomass plants. In order to convert biomass to high value products, such as transportation fuels, one promising process is to first convert the biomass to syngas by gasification. Gasification is a well-known process for producing synthesis gas (syngas), which is a gas mixture containing varying amounts of carbon monoxide and hydrogen as the major components.

Various types of gasifier designs are known. The most common type of gasifier used in biomass gasification is believed to be an up-draft fixed-bed design (counter-current) design, in which air, oxygen and/or steam flows upward through a permeable bed of biomass and counter-currently to the flow of ash and other byproducts of the reaction. Typical up-draft gasifiers have significant technical shortcomings. First, the introduction of air into the hot gasification chamber partly combusts the biomass, resulting in a lower overall heating value compared to gasifiers that employ indirect heating. Second, if air is used as the gasification agent, nitrogen in the air which is a diluen, reduces the energy content per unit volume of output gas, making the output gas less useful for such things as gas turbines, for storage, and for subsequent chemical processing. Third, tars and phenolic hydrocarbons produced in an up-draft gasifier require removal to reduce emissions, avoid fouling of a gas turbine, and avoid catalyst poisoning when used to create liquid fuels. The removal equipment adds to system complexity and size, with the result that for economic reasons the gasifier is usually limited only to large installations. Because biomass is a low-energy content fuel and is dispersed geographically, a large-scale gasifier requires transport and storage of the biomass, which negatively affects the economic payback for the system.

A more advantageous type of gasifier for biomass is a fluidized bed gasifier whereby a volume of gas, such as steam and air and/or oxygen is passed through a bed of biomass with sufficient velocity to create a fluidized-bed of biomass particles. This mode of operation is advantageous to up-draft fixed bed gasifiers in that the fluidized bed allows for a more uniform temperature distribution within the gasifier and thus can result in a higher syngas yield and a reduction in unwanted by-products, such as tar and soot. This type of gasifier suffers from a requirement that the particles of biomass must be reduced in size by several orders of magnitude that can consume a significant amount of energy—in some cases up to 30% of the energy contained in the biomass itself.

In view of the above, there is a need for biomass gasification processes and equipment that are economically practical for use at medium- to small-scale installations, including direct sources of biomass such as agricultural operations (for example, farms), factories in which biomass materials are starting materials and/or byproducts (for example, paper mills, ethanol plants, etc.), bioplants, and small towns or villages. There is also a need for biomass pretreatment processes that result in a more efficient and economical feed for gasification. One such pretreatment is torrefaction. Torrefaction is a mild pretreatment of biomass at a temperature from about 200° C. to about 350° C. The properties of the biomass are changed to increase its heating value, reduce its tendency to degrade during storage, and make it more friable and hence easier to mill. Conventional torrefaction processes are used to produce a densified product that can be used in place of or in conjunction with coal.

While both torrefaction and gasification of biomass are well known, there is still a need in the art for improved processes combining these two technologies that can lead to a more efficient and economical process for converting biomass to transportation fuels.

SUMMARY OF THE INVENTION

In accordance with the present invention there is provided a process for preparing a biomass feedstream for gasification, which process comprises:

a) comminuting said biomass to an effective particle size;

b) conducting said comminuted biomass to a drying zone wherein at least about 90 wt. % of water is removed thereby resulting in a dried comminuted biomass stream and a first vapor stream;

c) passing said dried comminuted biomass stream to a torrefaction zone where it is torrefied at temperatures ranging from about 200° C. to about 350° C., in a substantially non-oxidizing environment and at an effective residence time thereby resulting in a second vapor phase stream comprised of water vapor and small amounts of organic components, and a torrefied dried comminuted biomass stream;

d) passing at least a portion of said torrefied dried comminuted biomass stream to a gasification zone;

e) venting at least a portion of said first vapor stream to the atmosphere and conducting at least a portion of any remaining first vapor stream to a combustion zone;

f) conducting at least a portion of said second vapor stream to said combustion zone and recycling at least a portion of any remaining second vapor stream to said torrefaction zone to act as a sweep gas, wherein said combustion zone is operated at an effective time and temperature that will result in the conversion of at least 99 wt. % of any volatile organic components from said second vapor phase to a hot flue gas;

g) conducting a portion of said hot flue gas to said drying zone to provide at least a portion of the heat necessary to dry the biomass to a predetermined level;

h) passing at least a portion of the remaining hot flue gas through a first passageway of a heat exchanger having a first passageway and a second passageway contiguous to each other but not in fluid communication with each other, wherein each of said passageways having an inlet and an outlet and wherein each passageway is constructed to allow a fluid to pass from its inlet to its outlet and to allow heat to be transferred from a fluid of one passageway to a fluid in the other passageway; and i) passing a heat transfer medium through said second passageway of said heat exchanger wherein heat is transferred from said hot flue gas passing through said first passageway of said heat exchanger thereby resulting in a heated heat transfer medium and a cooled flue gas.

BRIEF DESCRIPTION OF THE FIGURE

The sole FIGURE hereof is a simplified flow diagram of one preferred embodiment for practicing the present invention.

DETAILED DESCRIPTION OF THE INVENTION

Any biomass feedstock can be used in the practice of the present invention. Preferred are plant biomass feedstocks, typically referred to as lignocellulosic feedstocks, which are generally comprised of cellulose, hemicellulose, and lignin. Non-limiting examples of plant, or lignocellulosic, feedstocks include non-woody plant biomass, cultivated crops, such as, but not limited to, grasses, for example, but not limited to, C4 grasses, such as switchgrass, cord grass, rye grass, miscanthus, reed canary grass, or a combination thereof, or sugar processing residues such as bagasse, or beet pulp, agricultural residues, for example, soybean stover, corn stover, rice straw, rice hulls, barley straw, corn cobs, wheat straw, canola straw, rice straw, oat straw, oat hulls, corn fiber, recycled wood pulp fiber, sawdust, hardwood, for example aspen wood and sawdust, softwood, or a combination thereof. Further, the lignocellulosic feedstock may include cellulosic waste material such as, but not limited to, newsprint, cardboard, sawdust, and the like. For urban areas, the best potential plant biomass feedstock includes yard waste (e.g., grass clippings, leaves, tree clippings, and brush) and vegetable processing waste.

Lignocellulosic feedstock can include one species of fiber or alternatively, lignocellulosic feedstock can include a mixture of fibers that originate from different lignocellulosic feedstocks. Furthermore, the lignocellulosic feedstock can comprise fresh lignocellulosic feedstock, partially dried lignocellulosic feedstock, fully dried lignocellulosic feedstock or a combination thereof. In general, the term "biomass" as used herein includes all of the terms, plant biomass, lignocellulosic, cellulosic, and hemicellulosic. It is preferred that the biomass used in the practice of the present invention comprised at least about 30 wt. % cellulose/hemicelluloses, based on the total weight of the biomass.

The biomass is preferably dried, then reduced to an effective size before the torrefaction pretreatment step. Technologies for drying biomass are well known in the art and include both passive, as well as active drying. Passive drying is preferred for cost considerations, but depending on the nature of the biomass, passive drying may not be able to reduce the moisture level to a level acceptable for being fed to a gasifier. Therefore, some form of active drying, such as the use of an external heat source and blowers may be needed.

It is preferred that the biomass, after drying, contain no more than about 20 wt. %, preferably no more that about 15 wt. %, and more preferably no more than about 10 wt. % water, based on the total weight of the biomass after drying. The biomass is subjected to a size reduction step to reduce it to a size suitable for drying and torrefaction. It is preferred that the size reduction step result in a biomass feed having an average particle size of about 0.1 inch to about 3 inches, preferably from about 0.25 inches to 1.5 inches. If any of the biomass is to be sent directly to a gasifier than it is preferred that the average particle size of that portion should be from about 1 to 500 microns, preferably from about 150 microns to 300 microns. The fibrous structure of the biomass makes it very difficult and costly to reduce its particle size. Non-limiting examples of mechanical size reduction equipment include rotary breakers, roll crushers, jet mills, cryogenic mills, hammer mills, impactors, tumbling mills, roller mills, shear grinders, and knife mills. Hammer mills are preferred for the practice of the present invention.

After size reduction the biomass is subjected to torrefaction which results in an increase in its carbon content, a reduction in oxygen content, and the substantial elimination of storage hygroscopicity and degradation. Torrefaction increases the energy density of biomass materials, such as cellulosic materials, by decomposing at least a portion of the reactive fraction of hemicelluloses. The result is that the energy content per unit mass of torrefied product is increased compared to the original biomass feed. Torrefaction of biomass of the present invention is performed at temperatures from about 200° C. to about 350° C., preferably from about 225° C. to about 320° C., more preferably from about 250° C. to about 300° C. During torrefaction, the biomass properties are changed, which results in better fuel quality for gasification and combustion. Conventionally, torrefaction is usually followed by pelletizing to yield a product that is suitable as a fuel substitute for coal. For purposes of this application, the torrefied biomass is not pelletized, but is instead reduced to a particle size that will be suitable for use in a fluid-bed gasifier. This particle size will typically be in the range of about 1 micron to 500 microns, preferably from about 150 microns to about 300 microns. If the biomass is a plant biomass, at least a portion of the cellulose and hemicellulose in the biomass will undergo hydrolysis and dehydration reactions, which primarily removes $CH_3O-$, $HCOO-$, $CH_3COO-$ functional groups from the hemicellulose. Hydrolysis reactions also cleave the C—O—C linkages in the polymeric chains that comprise the major constituents in the biomass. Acidic components in the resulting tor-gas and the ash components from the biomass, have the potential to catalyze these reactions. The torrefaction process results in a tor-gas and a solid biomass product having a higher energy density than the feedstock.

Further, torrefaction is capable of producing a relatively uniform pretreated biomass from a wide variety of biomass materials. If desired, the severity of the torrefaction process can be altered to produce a torrefied product having substantially the same energy content as that produced from a completely different biomass feedstock. This has advantages in the design of a gasifier feed system and greatly simplifies the gasifier operation with respect to controlling the $H_2$:CO ratio in the resulting syngas. In addition, by selectively removing the carboxylates in the torrefaction unit, it is believed that less methane will be produced and fewer tars will be formed during gasification by reactions between aldehydes and carboxylic acids formed by the decomposition of hemicellulose and acids and phenols derived from lignin.

Torrefied biomass retains a high percentage of the energy content of the initial biomass feedstock (ca. ~90%). Gaseous products produced during torrefaction are typically comprised of condensable and non-condensable gases. The condensable gases are primarily water, acetic acid, and oxygenates such as furfural, formic acid, methanol, and lactic acid. As previously mentioned, it is preferred that the biomass feedstock be dried prior to torrefaction to facilitate use of the condensable oxygenates as a heating fuel (typically having a heating content greater than 65 BTU/SCF). The non-condensable gases are comprised primarily of carbon dioxide and carbon monoxide, but may also contain small amounts of hydrogen and methane.

The present invention will be better understood with reference to the FIGURE hereof. This FIGURE is a simple block diagram representation of a preferred mode for practicing the present invention. A biomass, preferably a cellulosic biomass, feedstock is fed via line 10 to milling zone 100 where it is reduced to a particle size of about 0.25 to about 3 inches, preferably from about 0.1 to 3.0 inches. The fibrous structure of the biomass makes it very difficult and costly to reduce its particle size and hence minimal size reduction is preferred at this point in the process. As previously mentioned, non-limiting examples of mechanical size reduction equipment that can be used in milling zone 100 include rotary breakers, roll crushers, hammer-mills, impactors, tumbling mills, roller mills, shear grinders, and knife mills. Hammer-mills are preferred for the practice of the present invention. The biomass feedstock, now of reduced size, is passed via line 12 to feed bin 110 where it is held until being passed through first metering valve 13 and then via line 14 to drying reactor 120, which is primarily a drying vessel. The drying reactor is operated in an oxidizing or non-oxidizing atmosphere and at an outlet temperature from about 200° C. to about 350° C., preferably from about 225° to about 320° C., and more preferably at a temperature of about 250° to about 300° C. The drying reactor is most optimally a direct dryer operated in a co-current mode. Total residence time in the drying zone will be an effective residence time. By "effective residence time" we mean a residence time that will allow for removing at least about 90 wt. %, preferably at least about 95 wt. %, more preferably at least about 98 wt. %, and most preferably substantially all of the free moisture from the biomass. Typically this effective residence time will be from about 10 to about 60 minutes, preferably from about 10 to about 30 minutes with lower temperatures requiring longer times. The residence time of the biomass in the drying reactor, as well as in the torrefaction stage, will be in substantially the same range, but not necessarily identical residence times. The choice of time/temperature combination is affected by competing requirements; higher temperatures reduce residence time and lead to smaller reactors. But if the temperature is too high, reactions can become exothermic and can even cause a runaway reaction. Hence, the time/temperature combination must be carefully selected, which selection is within the skill of those in the art. It is preferred that the residence time be from about 10 to about 30 minutes. Substantially all of the moisture is preferably driven off during the initial stage of drying followed by the formation of some minor reaction products that primarily comprise the vapor phase product.

The resulting dried torrefied biomass solids from 120 are conducted from dryer 120 to torrefaction reactor 130, via line 38. The vapor phase from the drying reactor is exhausted through line 16, which is split into stream 17 which is preferably vented, and 18 which is conducted to combustion zone 160. The portion of stream 16 that is vented is managed to help control the temperature of combustion zone 160.

A vapor phase product (tor-gas) and torrefied solids are produced in the torrefaction reactor 130. The torrefaction reactor 130 is operated in a non-oxidizing atmosphere and at a temperature from about 200° C. to about 350° C., preferably from about 225° to about 320° C., and more preferably at a temperature of about 250° to about 300° C. The resulting tor-gas will typically be comprised of primarily water vapor with additional amounts of methane, methanol, acetol, CO, $CO_2$, furfural, and low carbon organic acids such as formic acid, acetic acid, and lactic acid. The torrefaction reactor requires a sweep gas to ensure that reaction products are removed from the reactor and is preferably flowed in countercurrent mode. The tor-gas exits the torrefaction reactor 130 via line 24 and is split into two portions; line 26 which is recycled to torrefaction reactor 130 to act as the sweep gas and via line 25 which to the combustor 160. The portion of stream 24 that is sent to the combustor is controlled to maintain an effective flow of sweep gas to the torrefaction reactor. By effective amount we mean that amount needed that would be effective for sweeping the torrefaction zones of tor-gas product. Any excess vapor phase fraction from stream 24 is sent to the combustor 160.

Any type of torrefaction reactor can be used in the practice of the present invention. Non-limiting example of such types of torrefaction reactors include continuous reactors, non-limiting example that include horizontal moving bed reactors, fluid bed reactors, and jet mill reactors. It is preferred that the reactor be a moving bed reactor. If a fluid bed reactor is used it is preferred that a cyclone be used to separate fines from the resulting product vapor phase that is passed via line 24. The separated fines can be returned to the fluid bed.

Excess tor-gas stream 25, and a residual flue gas stream 18 are combined with blown air via line 20 that is produced by passing air at low pressure via 19 through a blower 180. The blown air, excess tor-gas, and residual flue gas are combusted in the combustor 160 at an effective temperature to destroy at least 99% of the volatile organic components of the tor-gas and produce a heated flue gas 32.

A portion of the heated flue gas 34 is returned to the dryer 120 to provide at least a portion of the heat needed to maintain the desired dryer temperature. The remaining portion of the flue gas 33 is directed heat exchanger 170 whereby a heat transfer fluid 35 is heated, resulting in a cooled flue gas stream 37 and heated heat transfer fluid stream 36.

The final torrefied biomass solids exit the torrefaction reactor 130 via line 46 and are passed to torrefied biomass bin 200 where they are metered via second metering valve 41 to storage or directly to a gasification unit (not shown) for the production of syngas. An optional milling step 210 can be used in the event the particle size of the torrefied biomass exiting second torrefaction reactor 130 is too large for the intended gasifier. Any suitable milling apparatus can be used to reduce the size to a fluid gasification size.

It will be understood that a jet mill torrefaction reactor can be used as the torrefaction reactor. If a jet mill torrefaction reactor is used then there will be no need for a milling step prior to gasification since the particle size of the biomass exiting a jet mill reactor will be well within the acceptable particle size for fluid bed gasification.

What is claimed is:

1. In accordance with the present invention there is provided a process for preparing a biomass feedstream for gasification, comprising:
   a) comminuting a moisture containing biomass to an effective particle size;
   b) conducting said comminuted biomass to a drying zone wherein at least about 90 wt. % of water is removed thereby resulting in a dried comminuted biomass feedstream and a first vapor phase stream;
   c) passing said dried comminuted biomass feedstream to a torrefaction zone where it is conducted through said torrefaction zone and is torrefied at temperatures ranging from about 200° C. to about 350° C., in a substantially non-oxidizing environment and at an effective residence time to result in a second vapor phase stream comprised of water vapor and small amounts of organic components, and a torrefied dried comminuted biomass stream;

d) passing at least a portion of said torrefied dried comminuted biomass stream to a gasification zone;

e) venting at least a portion of said first vapor stream to the atmosphere and conducting at least a portion of any remaining first vapor stream to a combustion zone;

f) conducting at least a portion of said first vapor phase stream and said second vapor stream along with blown air to said combustion zone and recycling at least a portion of any remaining second vapor stream to said torrefaction zone to act as a sweep gas which flows through said torrefaction zone countercurrent to the flow of said biomass feedstream, wherein said combustion zone is operated at an effective time and temperature that will result in the conversion of at least 99 wt. % of any volatile organic components from said second vapor phase to a hot flue gas;

g) conducting a portion of said hot flue gas to said drying zone to provide at least a portion of the heat necessary to dry the biomass to a predetermined level;

h) passing at least a portion of the remaining hot flue gas through a first passageway of a heat exchanger having a first passageway and a second passageway contiguous to each other but not in fluid communication with each other, wherein each of said passageways having an inlet and an outlet and wherein each passageway is constructed to allow a fluid to pass from its inlet to its outlet and to allow heat to be transferred from a fluid of one passageway to a fluid in the other passageway; and i) passing a heat transfer medium through said second passageway of said heat exchanger wherein heat is transferred from said hot flue gas passing through said first passageway of said heat exchanger thereby resulting in a heated heat transfer medium and a cooled flue gas.

2. The process of claim 1 wherein the biomass is a lignocellulosic material.

3. The process of claim 2 wherein the lignocellulosic biomass is selected from the group consisting of corn, corn stover, corn cobs, alfalfa stems, wheat straw, rice straw, rice hulls, kennaf, distiller's grains, sugar cane bagasse, sugar beet tailings wood wastes, railroad ties, trees, softwood forest thinnings, barky wastes, sawdust, paper, wood fiber, grass crops, grass clippings, tree clippings and the like.

4. The process of claim 3 wherein the lignocellulosic biomass is selected from sugar cane bagasse and sugar beet tailings.

5. The process of claim 1 wherein the temperature of said drying zone is from about 200° C. to about 350° C.

6. The process of claim 5 wherein the temperature of drying zone is from about 225° C. to about 320° C.

7. The process of claim 1 wherein the temperature of said torrefaction zone is from about 200° C. to about 350° C.

8. The process of claim 1 wherein the temperature of said torrefaction zone is from about 225° C. to about 320° C.

9. The process of claim 1 wherein at least about 98 wt. % of the moisture is removed from the biomass in said drying zone.

10. The process of claim 9 wherein substantially all of the moisture is removed from the biomass in said drying zone.

11. The process of claim 1 wherein the residence time of the biomass in said drying zone is from about 10 to 60 minutes.

12. The process of claim 1 wherein the vessels used in said drying zone and said torrefaction zone are independently selected from the group consisting of moving bed reactors, fluid bed reactors and jet mill reaction vessels.

13. The process of claim 12 wherein the reaction vessels for both said drying zone and said torrefaction zone are moving bed reaction vessels.

14. The process of claim 1 wherein the gasification zone is a fluid bed gasification zone.

15. The process of claim 1 wherein the biomass is comminuted to an average particle size of from about 0.1 to 3 inches.

16. The process of claim 1 wherein the torrefied biomass is reduced to a particle size ranging from about 1 to 500 microns.

* * * * *